(12) United States Patent
Spilsbury et al.

(10) Patent No.: US 8,756,218 B1
(45) Date of Patent: Jun. 17, 2014

(54) QUERY CLASSIFICATION BASED ON SEARCH ENGINE RESULTS

(75) Inventors: Brian Spilsbury, Seoul (KR); Vince Bae, Mountain View, CA (US); Junyoung Lee, Mountain View, CA (US); Kyungwon Kang, Seoul (KR)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/210,989

(22) Filed: Aug. 16, 2011

(51) Int. Cl.
*G06F 17/30* (2006.01)
(52) U.S. Cl.
USPC .......................................... 707/713; 707/723
(58) Field of Classification Search
USPC ................................ 707/713, 723, 728; 704/9
See application file for complete search history.

(56) References Cited

U.S. PATENT DOCUMENTS

| 8,065,316 B1* | 11/2011 | Baker et al. ................... 707/768 |
| 2007/0094285 A1* | 4/2007 | Agichtein et al. ............ 707/101 |
| 2009/0319517 A1* | 12/2009 | Guha et al. ........................ 707/5 |
| 2010/0198837 A1* | 8/2010 | Wu et al. ....................... 707/748 |

\* cited by examiner

*Primary Examiner* — Monica Pyo
(74) *Attorney, Agent, or Firm* — Fish & Richardson P.C.

(57) ABSTRACT

The technology described relates to performing query classification by using search engine results. In one aspect, a method includes identifying, from search results responsive to first search queries, first collections of features associated with classifications for the first search queries; in response to receiving a second search query, generating from search results responsive to the second search query a second collection of features associated with the second search query; and comparing the first collections of features to the second collection of features to determine a particular classification for the second search query.

24 Claims, 5 Drawing Sheets

QUERY CLASSIFICATION BASED ON SEARCH ENGINE RESULTS

BACKGROUND

When receiving search queries at a search engine, accurate classification results in improved determination of the user intent behind the search query, and more relevant search engine results returned to the senders of the search queries. Classification can be a difficult task, because some search queries may be short, and contain ambiguous terms. Further, a particular classification for a given search query may change over time.

Search query classification can be performed by using historical query logs.

Building such query logs may take a long time, and curating the query logs may have an associated high cost. Finally, adding entirely new classifications and adding a new classification for old query terms may also present difficulties.

SUMMARY

The technology described relates to performing query classification based on search engine results. This technology is useful for classifying search queries, regardless of the size or availability of a query log that is available to provide historical query log data. This technology is also useful for providing updated classifications in cases where there has not been enough time to build a query log for entirely new classifications or new classifications for old search query terms.

One aspect of the technology is a computer-implemented method that includes generating feature vectors for a plurality of classifications, from search engine results responsive to training queries for the plurality of classifications. The method includes generating a search result vector from search engine results responsive to a search query. The method includes determining that the search query has a particular classification from the plurality of classifications, by processing the feature vectors with the search result vector. Other aspects of the technology can be embodied in corresponding systems, apparatus, and computer program products.

Various embodiments can include one or more of the following features.

Generating the feature vectors further comprises extracting a plurality of terms for the particular classification from the search engine results responsive to the training queries for the particular classification, and generating, from the plurality of terms for the particular classification, a particular feature vector for the particular classification.

The particular classification for the search query is determined in various manners. The particular classification is determined for the search query regardless of whether the search query is absent from the training queries. The particular classification that is determined for the search query changes over time, as the search engine results for the search query change over time. The particular classification that is determined for the search query changes over time, as the search engine results for the search query change over time, regardless of whether the feature vectors for the plurality of classifications remain unchanged over time.

The search engine results from which the search result vector and the feature vectors are generated, include one or more of: Uniform Resource Locators, titles of resources at the Uniform Resource Locators, and contents of the resources at the Uniform Resource Locators.

Responsive to the search query, vertical search engine results are returned responsive to the search query with a vertical content type according to the particular classification. For example, the vertical content type is a particular corpus.

Responsive to the search query, the search engine results that were used to generate the search result vector are returned. For example, the same search engine results are used to generate the search result vector, and to return to the querying client.

A further aspect of the technology is a computer-implemented method that includes identifying, from search results responsive to first search queries, first collections of features associated with classifications for the first search queries. The method includes, in response to receiving a second search query, generating from search results responsive to the second search query a second collection of features associated with the second search query. The method includes comparing the first collections of features to the second collection of features to determine a particular classification for the second search query.

Various embodiments can include one or more of the following features.

The first collections of features are represented using feature vectors.

The second collection of features is represented using a search result vector.

DETAILED DESCRIPTION

Various embodiments relate to classifying a search query, e.g., without requiring a query log.

A collection of features is identified that are associated with a classification for search queries. An example of a collection of features is a vector.

For example, a feature vector is generated for each predetermined classification by sending to a search engine, multiple training queries for the predetermined classification, and processing the search engine results responsive to the training queries into a feature vector. This is performed for each predetermined classification, resulting in multiple feature vectors each corresponding to a particular classification.

In one embodiment, the predetermined classifications represent topics, for example movie, music, sports, business, politics, and books. In another embodiment, the predetermined classifications represent corpuses, for example a collection of general web, news, question and answer, image, and video data. In yet another embodiment, the predetermined classifications reflect topics and corpuses.

Figure 1:
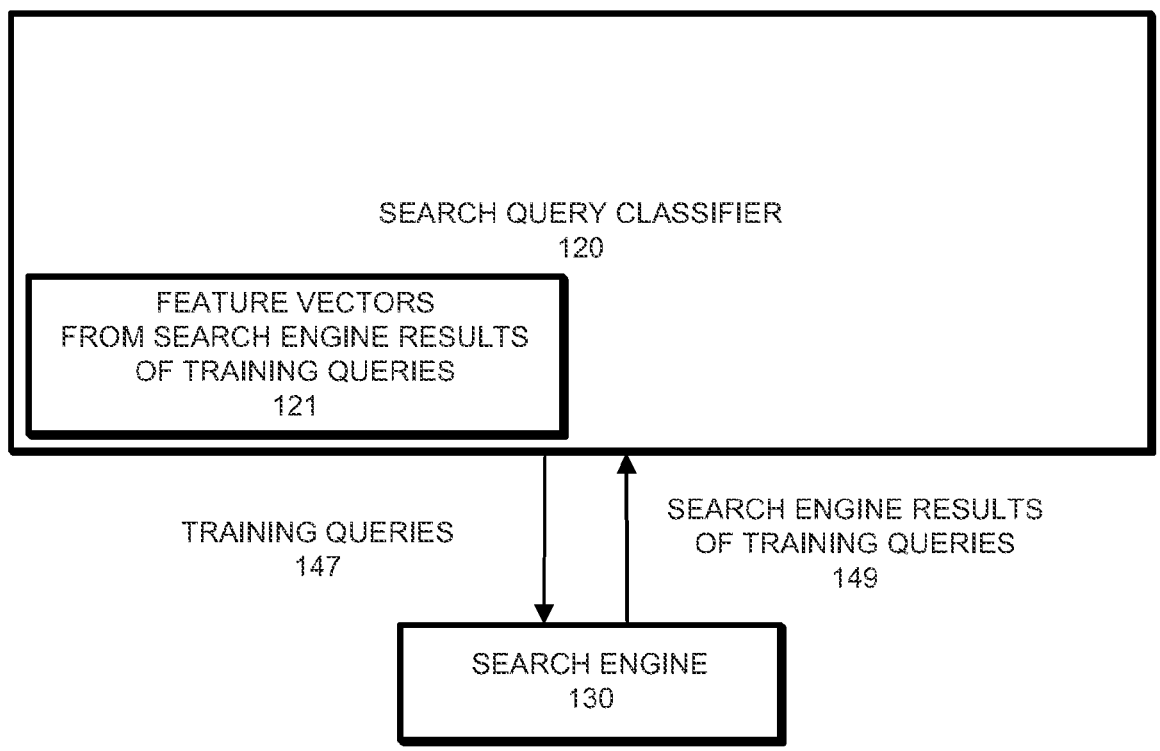
FIG. 1 is a block diagram of an example architecture for training a search query classifier, including a search query classifier and a search engine.

FIG. 1 is a block diagram of an example architecture for training the search query classifier, including a search query classifier 120 and a search engine 130.

The search query classifier 120 can generate feature vectors 121 that assist with classifying search queries. The search query classifier 120 sends training queries 147 to the search engine 130. The training queries 147 are chosen so that the search engine results will be for a particular classification. A particular classification can represent a topic or corpus. Training queries 147 are generated for the different particular classifications, and sent to the search engine 130. The search engine 130 returns search engine results responsive to the training queries 149 to the search query classifier 120. Finally, the search query classifier 120 processes the search engine results responsive to the training queries 149 to generate feature vectors 121. An example process of generating the feature vectors 121 is presented in FIG. 3. In one embodiment, a feature vector for a particular classification is a weighted set of terms from the search engine results for the training queries that are for the particular classification.

In one embodiment, a search result vector is generated for a search query by sending the search query to a search engine, and processing the search engine results responsive to the search query into a search result vector. In one embodiment, a search result vector is a weighted set of terms from the search engine results responsive to the search query. An example process of generating the search result vector is presented in FIG. 4. This search result vector is processed with the multiple feature vectors formed during training to score the different classifications corresponding to the different feature vectors, and finally to identify a particular classification for the search query (or alternatively, a set of leading classifications for the search query). An example process of processing the search result vector with the multiple feature vectors is presented in FIG. 4.

Figure 2:
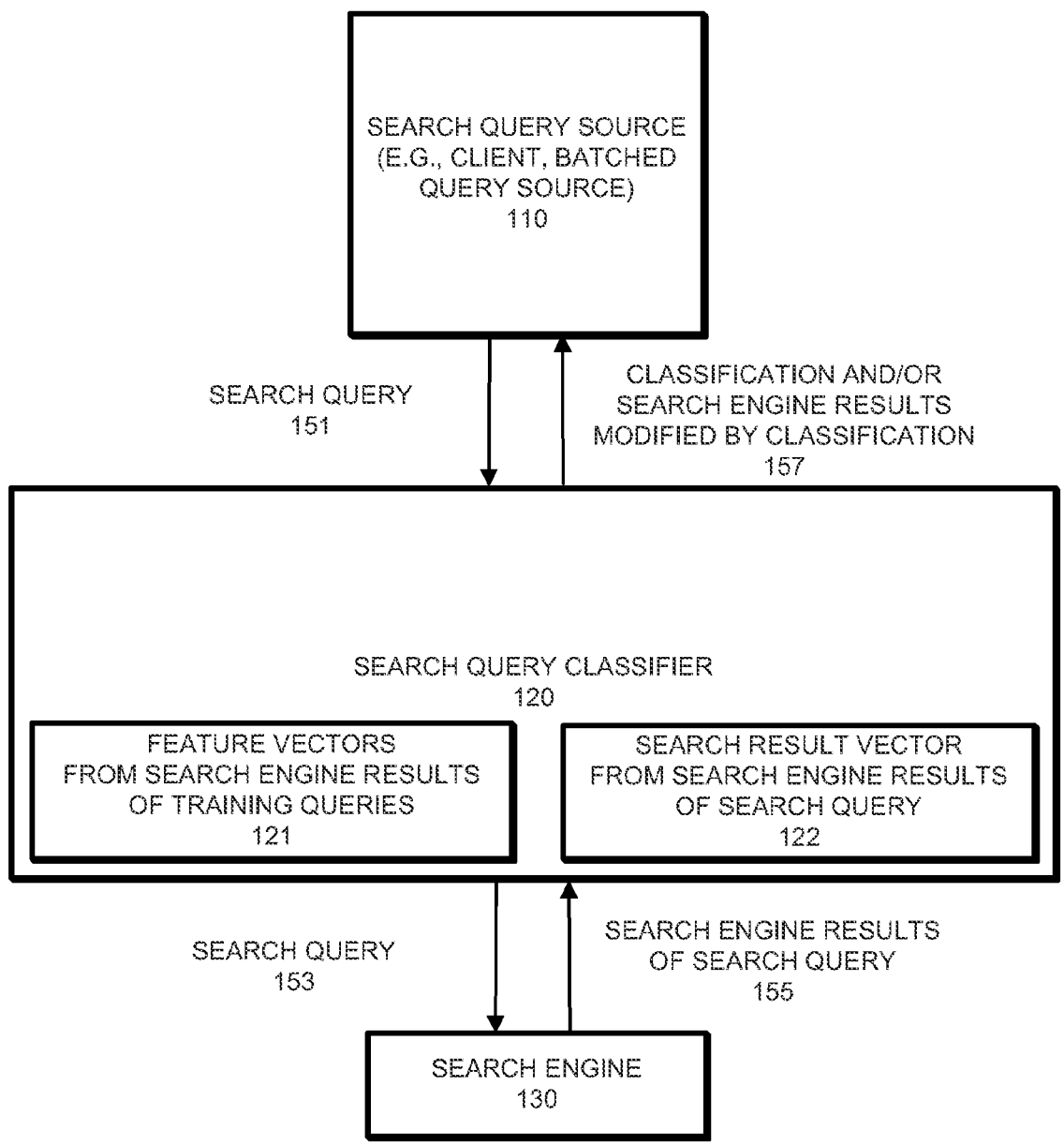
FIG. 2 is a block diagram of an example architecture for classifying search queries, including a search query source, search query classifier and a search engine.

FIG. 2 is a block diagram of an example architecture for classifying search queries, including a search query source 110, search query classifier 120, and a search engine 130. The architecture of FIG. 2 can classify search queries into the predetermined classifications using feature vectors, e.g., feature vectors 121 for predetermined classifications from FIG. 1.

A search query source 110 sends a search query 151 to a search query classifier 120. The search query source 110 can be, for example, a client that sends a search query, or a server that acts as an intermediary between a client that originally sent a search query and the search query classifier 120. Such an intermediary server can batch multiple search queries for efficiency. The search query classifier 120 passes the search query 153 to a search engine 130. The search engine 130 returns search engine results responsive to the search query 155 to the search query classifier 120. The search query classifier 120 processes the search engine results responsive to the search query 155 to generate search result vector 122. An example process of generating the search result vector is presented in FIG. 4. In one embodiment, a search result vector for a search query is a weighted set of terms from the search engine results for the search query.

The search query classifier 120 can classify the search query 151. The search query classifier 120 processes the feature vectors 121 with the search result vector 122, for example performing dot products between the search result vector 122 and the feature vectors 121. For example, the processing can indicate that a particular one of the feature vectors is a leading dot product (e.g., highest or lowest). The search query classifier 120 completes the classification by determining that the search query 151 has the classification associated with the feature vector that resulted in the leading dot product. Other implementations are possible.

For example, the processing can indicate that several of the feature vectors are leading dot products (e.g., several highest or several lowest). The search query classifier 120 completes the classification by determining that the search query 151 has the possible classifications associated with the feature vectors that resulted in the leading dot products. The particular classifications can be multiple topics or multiple corpuses or both.

Finally, the search query classifier 120 returns to the search query source 110, search engine results 155 modified by the identified classification(s) determined for the search query 151. Alternatively, the search query classifier 120 returns the classification(s) determined for the search query 151.

Figure 4:
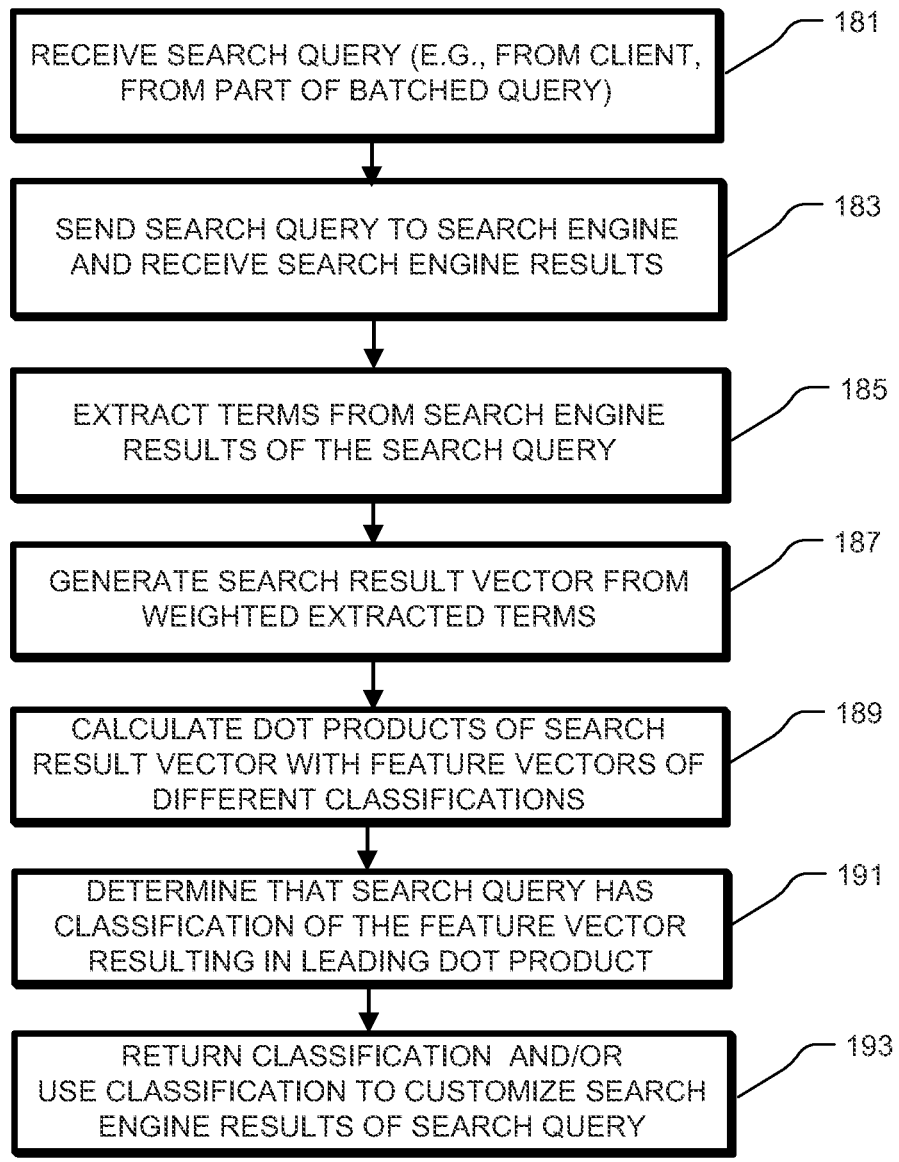
FIG. 4 is a flowchart of an example process flow of generating the search result vector from search engine results responsive to a search query, and classifying the search query.

A more detailed, example process that can be followed by the architecture of FIG. 2 is presented in FIG. 4.

Figure 3:
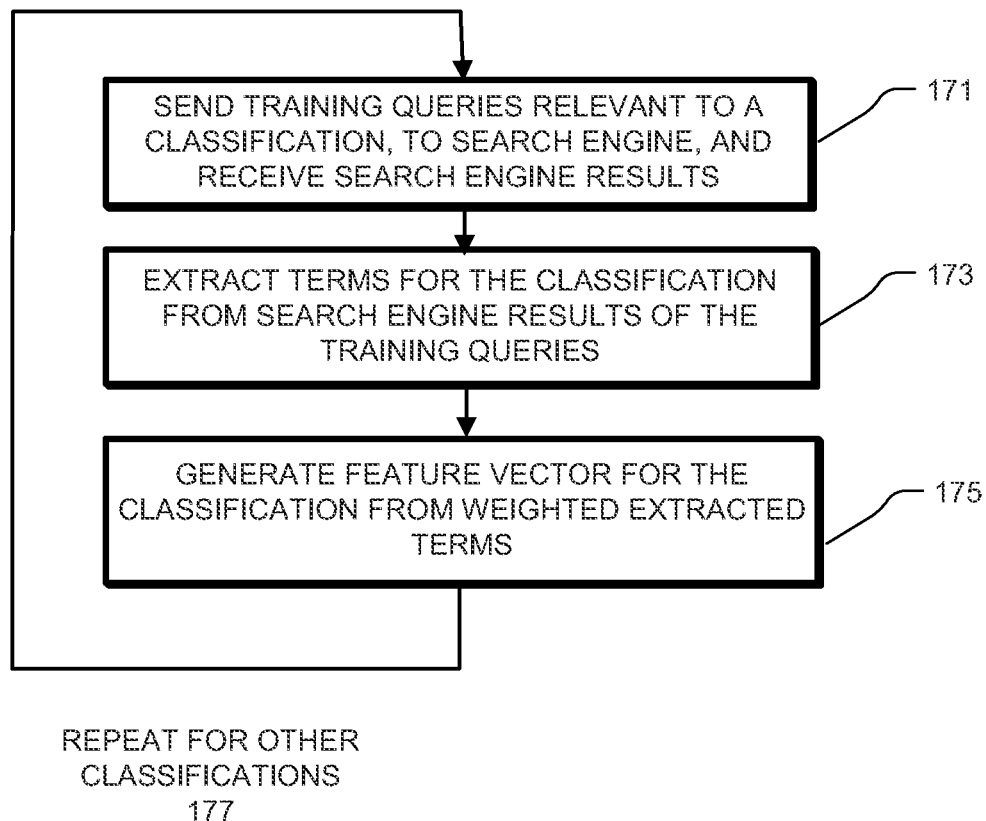
FIG. 3 is a flowchart of an example process flow of generating the feature vectors from search engine results responsive to the training queries.

FIG. 3 is a flowchart of an example process flow of generating the feature vectors from search engine results responsive to the training queries. In this example process flow, the search query classifier is trained.

In 171, training queries for a classification are sent from the search query classifier to a search engine, and the search engine results responsive to the training queries are received at the search query classifier. Multiple such training queries make up a classification-relevant query set. The training queries are chosen to generate search engine results with classification specific terms. For instance, for the movie classification, example queries can be "inception", "the lord of the rings movie", and "how to train your dragon". The example queries of "inception", "the lord of the rings movie", and "how to train your dragon" in turn generate search engine results with terms for the movie classification. These terms specific to the movie classification can be signals indicative of a movie classification. Classification-relevant training queries enable the search query classifier to extract signals for the classification, in this case a movie classification, from the search engine results responsive to the classification-relevant training queries. Each classification has its own set of queries to generate search engine results from which strong signals are extracted.

In 173, terms for the classification are extracted from the search engine results responsive to the training queries. A search engine result can include URLs, titles and snippets of content. In some embodiments, this takes multiple steps. For example, the tokenized set of search engine results is filtered to remove terms and other tokens that are not for the classification, as follows. The search engine results can be tokenized by splitting text separated by white-spaces and special characters. Some languages for example Chinese/Japanese/Korean (CJK) are tokenized using segmentation techniques directed to CJK. In some embodiments, the terms are counted, so that the terms and their frequencies are known. The top N most frequent terms can be chosen. Optionally, terms not for the classification can be removed, for example common terms like a/an/the.

In 175, a feature vector for the particular classification is generated from the weighted extracted terms. A vector is a weighted set of terms. The weighting information for terms in the vector is generated by comparing the terms with the search engine results from which the terms were extracted. Various alternatives exist for weighting the extracted terms, which can be used individually or in combination. One way to weight the terms is by a number of term instances in the search engine results. In another weighting scheme, terms are weighted by search engine result rankings of term instances in the search engine results. For example, term instances in the first search engine result ranking can receive a higher weight than the term instances in lower search engine result rankings. In yet another weighting scheme, terms are weighted by corpus types of the search engine result from which the term was extracted.

After weighting, the weights can by normalized, e.g., by summing the weights and dividing all of the weights by the total of all weights. Another normalization technique uses affine transformation. In 177, this process is repeated for the other classifications. At the conclusion of the process flow, the search query classifier has a set of one or more feature vectors. In one embodiment, each classification has a corresponding feature vector.

The above process flow is an example, and can be modified in various embodiments. Various embodiments include the above steps in different permutations and for different number of steps, varying from just one step to all of the steps. In further embodiments, shown steps can be removed; further steps can be added; and steps can be divided, combined, modified, and/or rearranged in order.

FIG. 4 is a flowchart of an example process flow of generating the search result vector from search engine results responsive to a search query, and classifying the search query. In this example process flow, the trained search query classifier is used to determine the classification of a search query.

In 181, a search query is received at the search query classifier, for example from client software/hardware or as part of a batched set of search queries. In 183, the search query is sent from the search query classifier to a search engine, and the search engine results responsive to the search query are received by the search query classifier. In 185, the search query classifier extracts terms from the search engine results responsive to the search query. In some embodiments, this takes multiple steps in a process similar to the training process described above. In some embodiments, the terms are counted, so that the terms and their frequencies are known. The top N most frequent terms can be chosen.

Then, the remaining terms are compared with the search engine results to extract weighting information for the next step. In 187, the search query classifier generates a search result vector from the weighted extracted terms. Weighting options in the process of generating the search result vector can be similar to the weighting options in the process of generating the feature vectors.

After weighting, the options for normalization in the process of generating the search result vector can be similar to the normalization options for the training process. In 189, the search query classifier calculates dot products of the search result vector with the feature vectors of the different classifications. Other embodiments can use other scoring methods for the vectors. In 191, the search query classifier determines that the search query has the classification that corresponds to the feature vector which resulted in the leading dot product (or in other embodiments, other leading score). In 193, the identified classification is returned to the source of the search query, and/or the search engine results responsive to the search query are customized with the classification and returned to the source of the search query.

The above process flow is an example and can be modified in various embodiments. Various embodiments include the above steps in different permutations and for different number of steps, varying from just one step to all of the steps. In further embodiments, shown steps can be removed; further steps can be added; and steps can be divided, combined, modified, and/or rearranged in order.

Figure 5:
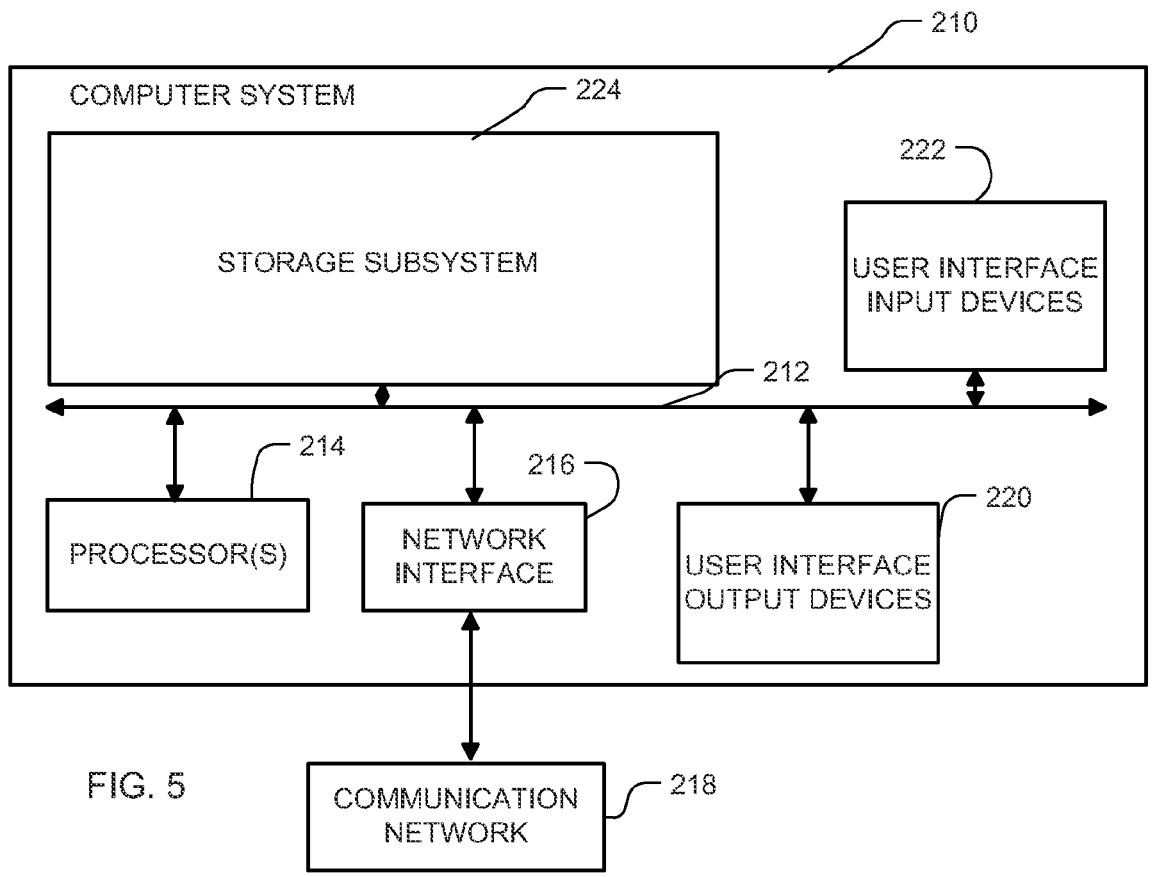
FIG. 5 is a block diagram of an example computer system configured for query classification based on search engine results.

FIG. 5 is a block diagram of an example computer system configured for query classification based on search engine results.

Computer system 210 typically includes at least one processor 214 which communicates with a number of peripheral devices via bus subsystem 212. These peripheral devices may include a storage subsystem 224, comprising for example memory devices and a file storage subsystem, user interface input devices 222, user interface output devices 220, and a network interface subsystem 216. The input and output devices allow user interaction with computer system 210. Network interface subsystem 216 provides an interface to outside networks, including an interface to communication network 218, and is coupled via communication network 218 to corresponding interface devices in other computer systems. Communication network 218 may comprise many interconnected computer systems and communication links. These communication links may be wireline links, optical links, wireless links, or any other mechanisms for communication of information. While in one embodiment, communication network 218 is the Internet, in other embodiments, communication network 218 may be any suitable computer network.

User interface input devices 222 may include a keyboard, pointing devices for example a mouse, trackball, touchpad, or graphics tablet, a scanner, a touchscreen incorporated into the display, audio input devices for example voice recognition systems, microphones, and other types of input devices. In general, use of the term "input device" is intended to include different possible types of devices and ways to input information into computer system 210 or onto communication network 218.

User interface output devices 220 may include a display subsystem, a printer, a fax machine, or non-visual displays for example audio output devices. The display subsystem may include a cathode ray tube (CRT), a flat-panel device for example a liquid crystal display (LCD), a projection device, or some other mechanism for creating a visible image. The display subsystem may also provide non-visual display for example via audio output devices. In general, use of the term "output device" is intended to include different possible types of devices and ways to output information from computer system 210 to the user or to another machine or computer system.

Storage subsystem 224 stores the basic programming and data constructs that provide the functionality of some or all of the tools described herein, including the feature vectors; search result vector; logic for generating feature vectors/search result vector; and logic for determining classification of the search result vector. These software modules are generally executed by processor 214 alone or in combination with other processors.

Memory used in the storage subsystem can include a number of memories including a main random access memory (RAM) for storage of instructions and data during program execution and a read only memory (ROM) in which fixed instructions are stored. A file storage subsystem can provide persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem in the storage subsystem 224, or in other machines accessible by the processor.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Computer system 210 can be of varying types including a personal computer, a portable computer, a workstation, a computer terminal, a network computer, a television, a mainframe, or any other data processing system or computing device. Due to the ever-changing nature of computers and networks, the description of computer system 210 depicted in FIG. 3 is intended only as a specific example for purposes of illustrating example embodiments. Many other configurations of computer system 210 are possible having more or less components than the computer system depicted in FIG. 3.

Figure 6:
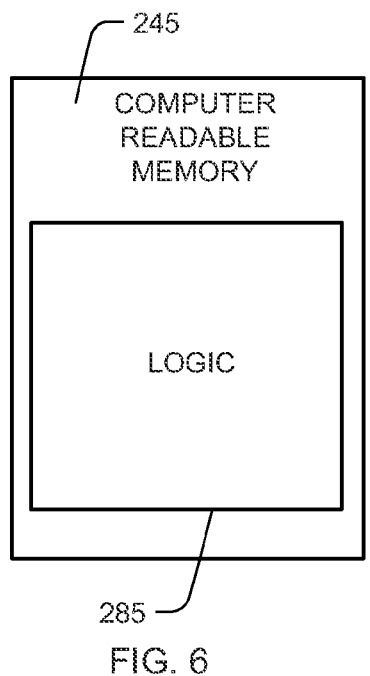
FIG. 6 is a block diagram of an example computer readable memory.

FIG. 6 is a simplified diagram of a computer readable memory. In various example embodiments, the computer readable memory stores, logic for generating feature vectors or search result vectors.

In FIG. 6 the product stores various logic according to the technology described herein, in a computer readable memory 245. The memory 245 can comprise a medium for example associated with file storage subsystem 224, and/or with network interface subsystem 216, or can comprise a data storage medium in a separate device. The medium used for the computer readable memory 245 can be a non-transitory medium, for example a hard disk, a floppy disk, a CDROM, an integrated circuit memory device, an optical medium, and removable media cartridge. The logic 285 as described herein can also be embodied by data coded on a transitory medium, for example a radio communication channel.

While the present technologies are disclosed by reference to the preferred embodiments and examples detailed above, it is understood that these examples are intended in an illustrative rather than in a limiting sense.

Thus, particular embodiments of the subject matter have been described. Other embodiments are within the scope of the following claims.

The invention claimed is:

1. A computer-implemented method comprising:
    defining a plurality of classifications;
    selecting a plurality of training queries as representative of a particular classification of the plurality of classifications;
    obtaining search results responsive to respective training queries in the plurality of training queries selected as representative of the particular classification;
    generating a classification feature vector for the particular classification from the search results responsive to respective training queries in the plurality of training queries selected as representative of the particular classification, wherein corresponding elements of the classification feature vector represent corresponding terms, and wherein a value of an element of the classification feature vector for the particular classification represents a term frequency of a corresponding term in the obtained search results responsive to the training queries selected for the particular classification;
    receiving a search query;
    obtaining search results responsive to the search query;
    generating a search result vector from the search results responsive to the search query;
    determining that the search result vector is closest to the classification feature vector for the particular classification relative to other respective classification feature vectors generated for other classifications in the plurality of classifications; and
    in response to determining that the search result vector is closest to the classification feature vector for the particular classification relative to other respective classification feature vectors generated for other classifications in the plurality of classifications, obtaining search results having a vertical content type according to the particular classification from a particular corpus; and
    providing the obtained search results having the vertical content type in response to the search query.

2. The method of claim 1, wherein generating a classification feature vector for the particular classification of the plurality of classifications comprises:
    determining, for each of a plurality of terms in the search results responsive to the respective training queries, a respective term frequency from term occurrences in the search results; and
    generating, from the term frequencies, a classification feature vector for the particular classification.

3. The method of claim 2, wherein determining, for each of a plurality of terms in the search results responsive to the respective training queries, a respective term frequency from terms occurring in the search results responsive to the training queries selected as representative of the particular classification comprises determining a respective term frequency from terms occurring in Uniform Resource Locators, titles, or snippets of the search results responsive to the respective training queries.

4. The method of claim 2, further comprising weighting each term occurrence by a respective ranking of a search result in which the term occurs.

5. The method of claim 2, further comprising weighting each term occurrence by an estimated click through rate of a search result in which the term occurs.

6. The method of claim 2, further comprising weighting each term occurrence by an corpus-specific weight of a corpus from which a search result in which the term occurs was obtained.

7. The method of claim 1, further comprising computing exactly one classification feature vector for each of the plurality of classifications.

8. The method of claim 1, wherein determining that the search result vector is closest to the classification feature vector for the particular classification relative to other respective classification feature vectors generated for other classifications in the plurality of classifications comprises:
    computing a respective dot product between the search result vector and each of the classification feature vectors; and
    determining a classification feature vector that has a highest dot product with the search result vector.

9. A system comprising:
    one or more computers and one or more storage devices storing instructions that are operable, when executed by the one or more computers, to cause the one or more computers to perform operations comprising:
    defining a plurality of classifications;
    selecting a plurality of training queries as representative of a particular classification of the plurality of classifications;
    obtaining search results responsive to respective training queries in the plurality of training queries selected as representative of the particular classification;
    generating a classification feature vector the particular classification from the search results responsive to respective training queries in the plurality of training queries selected as representative of the particular classification, wherein corresponding elements of the classification feature vector represent corresponding terms, and wherein a value of an element of the classification feature vector for the particular classification represents a term frequency of a corresponding term in the obtained search results responsive to the training queries selected for the particular classification;

receiving a search query;

obtaining search results responsive to the search query;

generating a search result vector from the search results responsive to the search query;

determining that the search result vector is closest to the classification feature vector for the particular classification relative to other classification feature vectors generated for other classifications in the plurality of classifications; and in response to determining that the search result vector is closest to the classification feature vector for the particular classification relative to other classification feature vectors generated for other classifications in the plurality of classifications, obtaining search results having a vertical content type according to the particular classification from a particular corpus; and providing the obtained search results having the vertical content type in response to the search query.

10. The system of claim 9, wherein generating a classification feature vector for a particular classification of the plurality of classifications comprises:

determining, for each of a plurality of terms in the search results responsive to the respective training queries, a respective term frequency from term occurrences in the search results; and generating, from the term frequencies, a classification feature vector for the particular classification.

11. The system of claim 10, wherein determining, for each of a plurality of terms in the search results responsive to the respective training queries, a respective term frequency from terms occurring in the search results responsive to the training queries selected as representative of the particular classification comprises determining a respective term frequency from terms occurring in Uniform Resource Locators, titles, or snippets of the search results responsive to the respective training queries.

12. The system of claim 10, wherein the operations further comprise weighting each term occurrence by a respective ranking of a search result in which the term occurs.

13. The system of claim 10, wherein the operations further comprise weighting each term occurrence by an estimated click through rate of a search result in which the term occurs.

14. The system of claim 10, wherein the operations further comprise weighting each term occurrence by a corpus-specific weight of a corpus from which a search result in which the term occurs was obtained.

15. The system of claim 9, wherein the operations further comprise computing exactly one classification feature vector for each of the plurality of classifications.

16. The system of claim 9, wherein determining that the search result vector is closest to the classification feature vector for the particular classification relative to other respective classification feature vectors generated for other classifications in the plurality of classifications comprises:

computing a respective dot product between the search result vector and each of the classification feature vectors; and determining a classification feature vector that has a highest dot product with the search result vector.

17. A computer program product, encoded on one or more non-transitory computer storage media, comprising instructions that when executed by one or more computers cause the one or more computers to perform operations comprising:

defining a plurality of classifications;

selecting a plurality of training queries as representative of a particular classification of the plurality of classifications;

obtaining search results responsive to respective training queries in the plurality of training queries selected as representative of the particular classification;

generating a classification feature vector the particular classification from the search results responsive to respective training queries in the plurality of training queries selected as representative of the particular classification, wherein corresponding elements of the classification feature vector represent corresponding terms, and wherein a value of an element of the classification feature vector for the particular classification represents a term frequency of a corresponding term in the obtained search results responsive to the training queries selected for the particular classification;

receiving a search query;

obtaining search results responsive to the search query;

generating a search result vector from the search results responsive to the search query;

determining that the search result vector is closest to the classification feature vector for the particular classification relative to other classification feature vectors generated for other classifications in the plurality of classifications; and in response to determining that the search result vector is closest to the classification feature vector for the particular classification relative to other classification feature vectors generated for other classifications in the plurality of classifications, obtaining search results having a vertical content type according to the particular classification from a particular corpus; and providing the obtained search results having the vertical content type in response to the search query.

18. The computer program product of claim 17, wherein generating a classification feature vector for a particular classification of the plurality of classifications comprises:

determining, for each of a plurality of terms in the search results responsive to the respective training queries, a respective term frequency from term occurrences in the search results; and generating, from the term frequencies, a classification feature vector for the particular classification.

19. The computer program product of claim 18, wherein determining, for each of a plurality of terms in the search results responsive to the respective training queries, a respective term frequency from terms occurring in the search results responsive to the training queries selected as representative of the particular classification comprises determining a respective term frequency from terms occurring in Uniform Resource Locators, titles, or snippets of the search results responsive to the respective training queries.

20. The computer program product of claim 18, wherein the operations further comprise weighting each term occurrence by a respective ranking of a search result in which the term occurs.

21. The computer program product of claim 18, wherein the operations further comprise weighting each term occurrence by an estimated click through rate of a search result in which the term occurs.

22. The computer program product of claim 18, wherein the operations further comprise weighting each term occurrence by a corpus-specific weight of a corpus from which a search result in which the term occurs was obtained.

23. The computer program product of claim 17, wherein the operations further comprise computing exactly one classification feature vector for each of the plurality of classifications.

24. The computer program product of claim 17, wherein determining that the search result vector is closest to the classification feature vector for the particular classification relative to other respective classification feature vectors generated for other classifications in the plurality of classifications comprises:
   computing a respective dot product between the search result vector and each of the classification feature vectors; and
   determining a classification feature vector that has a highest dot product with the search result vector.

* * * * *

UNITED STATES PATENT AND TRADEMARK OFFICE
CERTIFICATE OF CORRECTION

| | | |
|---|---|---|
| PATENT NO. | : 8,756,218 B1 | Page 1 of 1 |
| APPLICATION NO. | : 13/210989 | |
| DATED | : June 17, 2014 | |
| INVENTOR(S) | : Brian Spilsbury et al. | |

It is certified that error appears in the above-identified patent and that said Letters Patent is hereby corrected as shown below:

In the Claims

Column 8, line 60: In Claim 9, delete "the" and insert -- for the --, therefor.

Column 10, line 7: In Claim 17, delete "the" and insert -- for the --, therefor.

Signed and Sealed this
Nineteenth Day of August, 2014

Michelle K. Lee
*Deputy Director of the United States Patent and Trademark Office*